(12) United States Patent
Trumpf

(10) Patent No.: US 6,745,475 B1
(45) Date of Patent: Jun. 8, 2004

(54) BRUSHCUTTER

(75) Inventor: Johann Trumpf, Winnenden (DE)

(73) Assignee: Andreas Stihl AG & Co., Waiblingen (DE)

( * ) Notice: Subject to any disclaimer, the term of this patent is extended or adjusted under 35 U.S.C. 154(b) by 45 days.

(21) Appl. No.: 09/717,063

(22) Filed: Nov. 22, 2000

(30) Foreign Application Priority Data

Nov. 23, 1999 (DE) .......................................... 199 56 332

(51) Int. Cl.$^7$ ............................................... E21B 7/22
(52) U.S. Cl. ........................ 30/276; 30/DIG. 5; 30/340
(58) Field of Search ............................... 30/276, 277.4, 30/DIG. 5, 34 D; D8/8; 56/17.2, 17.5; 172/13, 15

(56) References Cited

U.S. PATENT DOCUMENTS

| | | | | |
|---|---|---|---|---|
| 2,519,936 A | * | 8/1950 | Sayre ........................ | 30/276 X |
| 4,122,601 A | * | 10/1978 | Katsuya ..................... | 30/276 X |
| 4,286,675 A | * | 9/1981 | Tuggle ...................... | 30/276 X |
| 4,491,184 A | * | 1/1985 | Kawaharazuka ........... | 30/276 X |
| 4,696,108 A | * | 9/1987 | Zerrer et al. .................... | 30/276 |
| 4,714,447 A | | 12/1987 | Hironaka | |
| 4,733,471 A | * | 3/1988 | Rahe ........................... | 30/276 |
| 4,759,128 A | * | 7/1988 | Katoh et al. .................... | 30/276 |
| 4,817,738 A | * | 4/1989 | Dorner et al. ............. | 30/276 X |
| 4,819,742 A | * | 4/1989 | Driggers .................... | 30/276 X |
| 4,841,929 A | * | 6/1989 | Tuggle et al. .............. | 30/276 X |
| 4,860,451 A | * | 8/1989 | Pilatowicz et al. ............ | 30/276 |
| 4,924,573 A | * | 5/1990 | Huddleston et al. ...... | 30/276 X |
| 5,375,666 A | | 12/1994 | Pettet et al. | |
| 5,379,846 A | * | 1/1995 | Wagster et al. ................ | 172/15 |
| 5,447,206 A | * | 9/1995 | Coleman et al. .......... | 30/276 X |
| 5,540,291 A | * | 7/1996 | Coleman ................... | 30/276 X |
| 5,615,970 A | * | 4/1997 | Reekie et al. ............. | 30/276 X |
| 5,692,306 A | | 12/1997 | Stoll et al. | |
| 5,774,993 A | * | 7/1998 | Schlessmann ................. | 30/276 |
| 5,855,069 A | * | 1/1999 | Matsubayashi et al. ....... | 30/276 |
| 5,931,736 A | * | 8/1999 | Scherer et al. ............ | 30/276 X |
| 5,933,966 A | * | 8/1999 | Yates et al. .................... | 30/276 |
| 6,213,677 B1 | * | 4/2001 | Yamane et al. ........... | 30/276 X |

FOREIGN PATENT DOCUMENTS

| | | |
|---|---|---|
| JP | 11056067 | 3/1999 |
| JP | 11275925 | 10/1999 |

* cited by examiner

Primary Examiner—Charles Goodman
(74) Attorney, Agent, or Firm—Walter Ottesen

(57) ABSTRACT

The invention relates to a brushcutter which is driven by an internal combustion engine (1) mounted in a housing (2). The brushcutter has a work tool (3) with a rotatable cutting tool (4). The brushcutter includes a guide tube (5) on which a cutterhead (3) is attached to an end (6) thereof and the engine housing (2) is attached to the other end (7). A drive shaft (8) is guided in the guide tube (5) and connects the engine (1) to the cutting tool (4). A guide handle (9) is arranged on the guide tube (5) at a spacing from the motor housing (2). The motor housing (2) includes a sleeve-shaped collar (10) which has such a configuration that it engages over the end (7) of the guide tube (5) facing toward the engine. The collar (10) is connected to the guide tube (5) at the free end (11) of the collar at a pregiven distance (a) to the end (7) of the guide tube (5) facing toward the engine.

12 Claims, 5 Drawing Sheets

BRUSHCUTTER

BACKGROUND OF THE INVENTION

A guide handle is provided for working with a brushcutter and this handle is mounted in the region of the center of gravity of the apparatus. In practice, it has been shown that the motor housing equipped with an internal combustion engine moves relative to the longitudinal axis of the guide tube in unfavorable rpm ranges such as idle. This excites torsion vibrations and can, in idle, lead to operating disturbances of the engine including engine standstill. To avoid vibrations, the engine rpm can be set higher but this leads to an unwanted high discharge of toxic substances.

SUMMARY OF THE INVENTION

It is an object of the invention to provide a brushcutter which is so improved that a low engine rpm can be adjusted for an operationally reliable running of the engine without limitation caused by vibrations occurring during operation.

The brushcutter of the invention includes: a motor housing; a guide tube having a first end connected to the motor housing and having a second end; a work tool mounted on the second end of the guide tube; an internal combustion engine mounted in the motor housing and having an output; a drive shaft rotatably journalled in the guide tube for connecting the work tool to the output of the engine; the guide tube having an end portion at the first end; the motor housing having a sleeve-shaped collar extending approximately coaxially over the end portion; the sleeve-shaped collar having a free end and the free end being at a distance (a) from the first end of the guide tube; and, means for connecting the collar at the free end to the guide tube so that the collar cannot rotate relative to the guide tube.

The motor housing is provided with a tubular-shaped collar which coaxially engages over the engine end of the guide tube over a defined length. The collar is connected at its free end with the guide tube so that it cannot rotate relative thereto. The connecting location has a constructive spacing of pregiven length to the end of the guide tube facing toward the engine. In this way, the part of the guide tube, which operates as a torsion spring, is shortened between guide tube and engine housing and its inherent frequency is correspondingly increased. The collar itself likewise operates as a torsion spring and, in contrast to the guide tube, can be suitably adapted to the requirements of the rotational vibration problem with respect to cross section, wall thickness and material selection. Especially a configuration of the collar in injection molded plastic provides an adapted spring stiffness. In addition, the plastic provides a high material damping compared to a guide tube made of metal material. Furthermore, the collar can be used as an ergonomically formed carrier holder because of the large cross section thereof compared to the guide tube.

In a region of the anti-rotation connection between the collar and the guide tube, a screw can be provided as a rotation lock. The screw is mounted in the collar and projects into a bore in the guide tube. In this way, a permanent alignment of the guide tube with the parts mounted thereon, such as the guide handle and the tool head, is ensured relative to the housing with minimum complexity.

The free end of the guide tube projecting into the collar is advantageously guided at a location close to the engine via a support having a longitudinal stop and a radial bearing. In this way, a precise alignment of the guide tube with the drive shaft, which is guided therein, relative to the engine is ensured with simple constructive means. At the same time, the bending load of the collar is reduced. Furthermore, the radial bearing, configured in a simple form as a slide bearing, permits a rotation of the engine housing relative to the end of the guide tube facing toward the engine whereby the collar can operate without restriction as a torsion spring and torsion damper. At least one of the surfaces of the guide tube and the slide bearing can be machined to increase the coefficient of friction in a supportive manner whereby friction is generated with a rotational vibration of the engine housing relative to the guide tube and, in this way, the damping of the vibration is increased.

The configuration of the collar in the form of two half shells permits a simple manufacture of the individual parts as well as a rapid assembly. The half shells, in turn, are advantageously configured as one piece with a corresponding component shell of the motor housing. The anti-rotation connection of the collar to the guide tube can be realized in a simple manner by clamping the two shells to each other with threaded fasteners.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
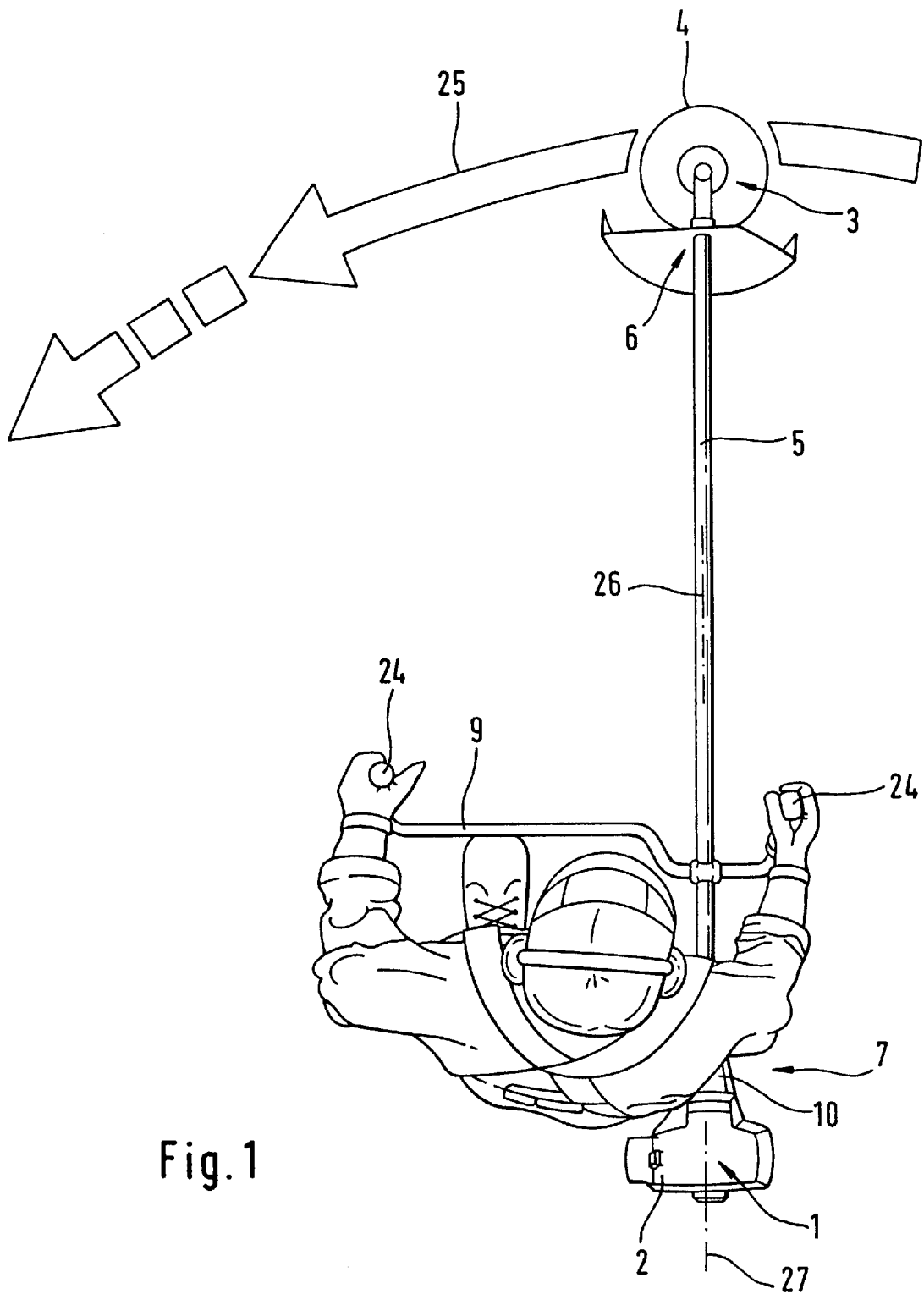
FIG. 1 is an overview showing the brushcutter of the invention in operational use.

FIG. 1 schematically shows an operator holding the brushcutter at a guide handle 9 having two handles 24. The guide handle 9 is also known as a steering rod and is attached to the guide tube 5 in the region of the center of gravity of the apparatus. The guide handle 9 can also be configured as a loop handle or the like.

A tool head 3 having a rotatable cutting tool 4 is mounted at one end 6 of the guide tube 5. The cutting tool 4 is guided along an arc-shaped path shown arrow 25 by guiding the brushcutter at the handle 9. A motor housing 2 is attached at the other end 7 of the guide tube 5 wherein an internal combustion engine 1 is mounted. The cutting tool 4 and the engine 1 are connected to each other via a drive shaft 8 rotatably mounted in the guide tube 5. In the embodiment shown, the engine 1 is so mounted that its crankshaft axis 27 is coincident with the longitudinal center axis 26 of the guide tube 5.

Figure 2:
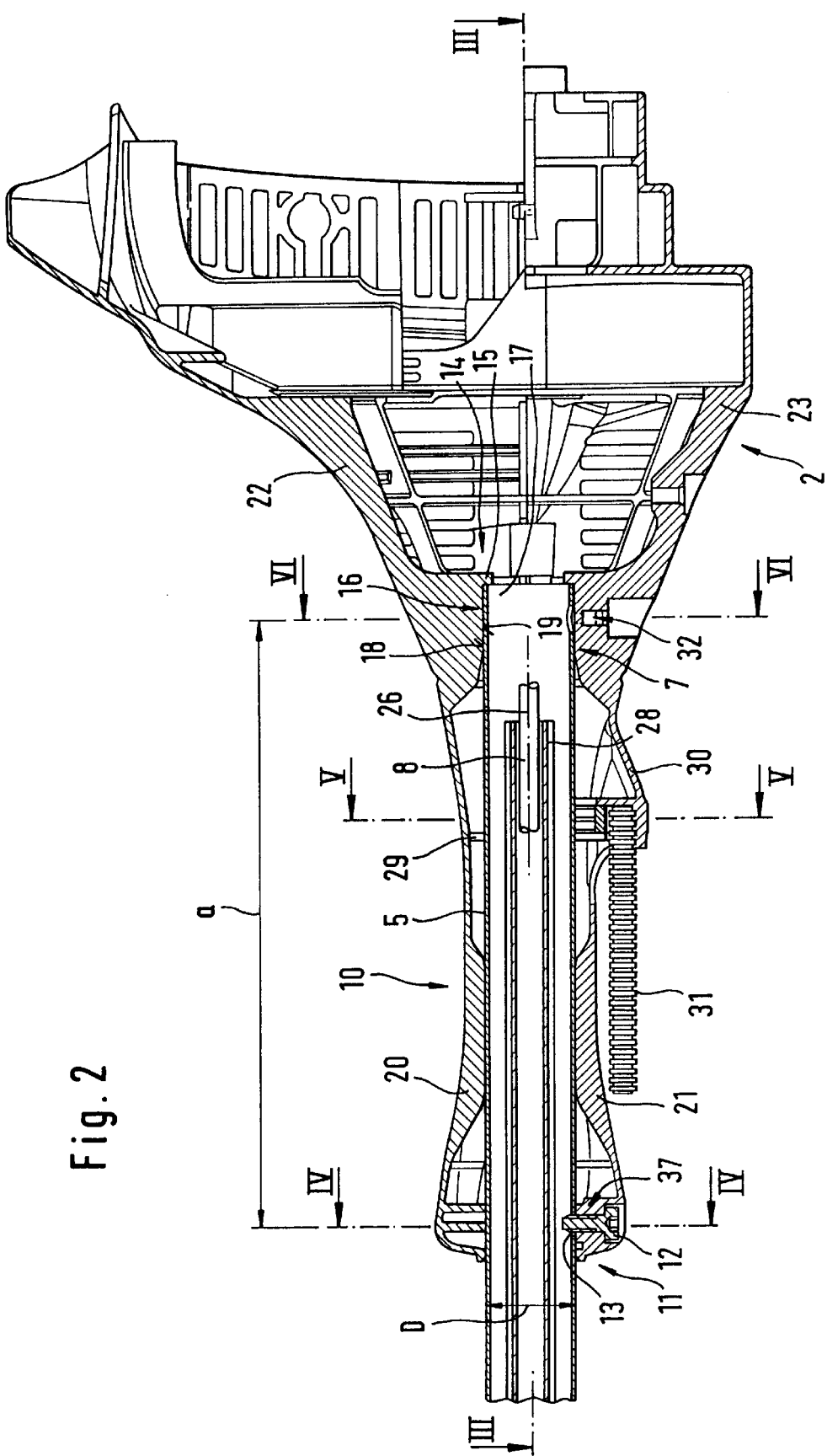
FIG. 2 shows, in section, the motor housing of the brushcutter of the invention.

The cross section view in FIG. 2 shows that the engine housing 2 is configured of two parts, namely, an upper component shell 22 and a lower component shell 23. The engine housing 2 includes a collar 10 which engages around the guide tube 5. The collar 10 is preferably configured as a one-piece tube which can be configured as one piece with the motor housing 2 or can be flange connected thereto. In the embodiment shown, the collar 10 comprises two half shells (20, 21). The upper half shell 20 is configured as one piece with the upper component shell 22 of the motor housing 2 as an injected molded plastic piece and the lower half shell 21 is configured as one piece with the lower half shell 23 of the motor housing 2 also as an injection molded plastic piece.

The free end 11 of the collar 10 is connected to the guide tube S so that it cannot rotate relative thereto at a distance (a) to the end 7 of the guide tube 5 facing toward the engine. The distance (a) is a multiple and, in the embodiment shown, is approximately seven times the diameter D of the guide tube 5.

The free end 11 has a rotation lock 37 for the guide tube 5 which, in the embodiment shown, is configured as a screw 12 held in the half shell 21 and engaging into a bore 13 of the guide tube 5. In the region of its engine end 7, the guide tube 5 is held close to the engine 1. The support 14 includes a longitudinal stop 15 and a radial support 16 to take up radial forces. In the embodiment shown, the radial support 16 is configured as a slide bearing 17 whereby the motor housing 2 can rotate elastically relative to the end 7 of the guide tube 5 facing toward the engine. The surface 18 of the slide bearing 17 and the surface 19 of the guide tube 5 (in the region of its end 7) are machined to increase the coefficient of friction so that the friction forces effect a further vibration damping with an oscillating relative rotation of the sleeve bearing 17 in the motor housing 2 relative to end 7 of the guide tube 5.

In guide tube 5, a shaft guide 28 made of a plastic tube is provided for accommodating the drive shaft 8. In the region of the end 7 of the guide tube 5 facing toward the engine, the lower component shell 23 has a maintenance opening 32 for accessing the sleeve bearing 17. Through this opening, means can be introduced to increase the coefficient of friction or to reduce the coefficient of friction in dependence upon need for influencing the vibration damping.

A support rib 29 is provided between the free end 11 and the support 14. The support rib 29 supports the thin-walled collar 10 radially against the guide tube 5 during loading without the matched vibration-damping system being affected. In the region of the support rib 29, the component shell 23 includes a scoop 30 wherein a flexible protective tube 31 is held for passing through a gas line 34 (FIG. 3).

Figure 3:
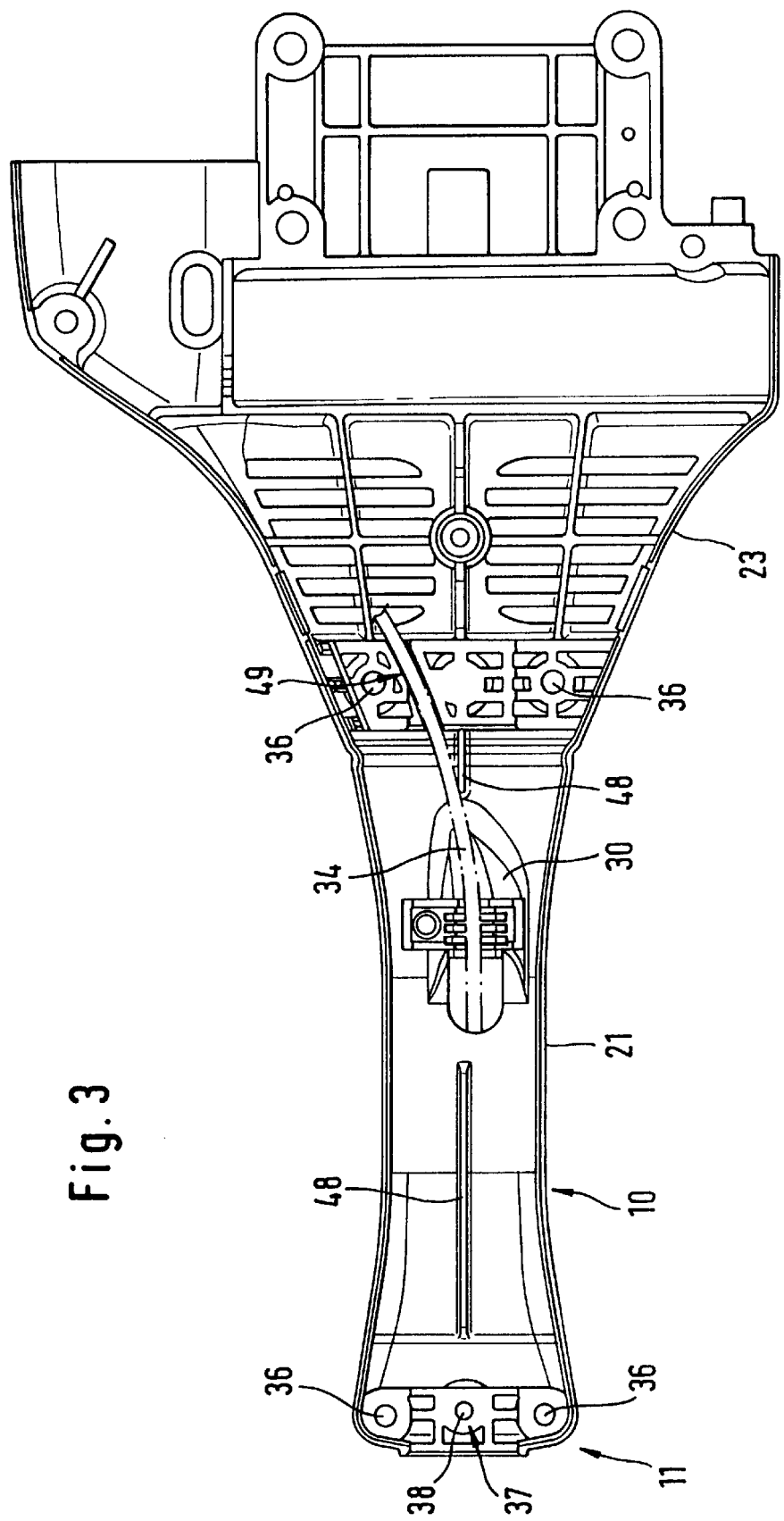
FIG. 3 is an inner view of a half shell of the motor housing in accordance with the embodiment of FIG. 2.

FIG. 3 shows an inner view of the lower half shell 23 of the engine housing 2 with the half shell 21 of the collar 10 formed as one piece thereon. In the region of the free end 11, two bores 36 are provided for connecting the lower component shell 23 to the upper component shell 22 with threaded fasteners. A further bore 38 for accommodating a screw 12 (FIG. 2) is shown between the two bores 36. The screw 12 is mounted as a rotational lock 37 for the guide tube 5. In the region of the radial support 16, two additional bores 36 are likewise provided to permit the two component shells 23 and 22 to be joined to each other with threaded fasteners. The radial support 16 is defined by a rib structure (FIG. 6) and functions in the manner of a sleeve bearing whereby, on the one hand, a high supporting capability is provided and, on the other hand, the requirements of the injection technology with respect to a thin wall is taken into account. A slot 49 is provided in the radial bearing 16 for passing through the gas line 34 which, in the region of the scoop 30, is held with the clamping ring 35 and, there, the gas line is brought from the housing interior outwardly to the handle 24. Longitudinal ribs 48 are provided between the free end 11 and the radial bearing 16 for imparting stiffness to the cross section and for increasing the resistance to bending of the collar 10 without affecting the torsion stiffness.

The collar 10 has an adequate width for accommodating the guide tube 5 and the bores 36 in the region of the free end 11 and of the radial bearing 16. Relative to these cross sections, the collar 10 is tapered in the region of the scoop 30 whereby, on the one hand, the torsion stiffness is adjusted to a desired amount and, on the other hand, the collar 10 is formed as an ergonomic handle.

Figure 4:
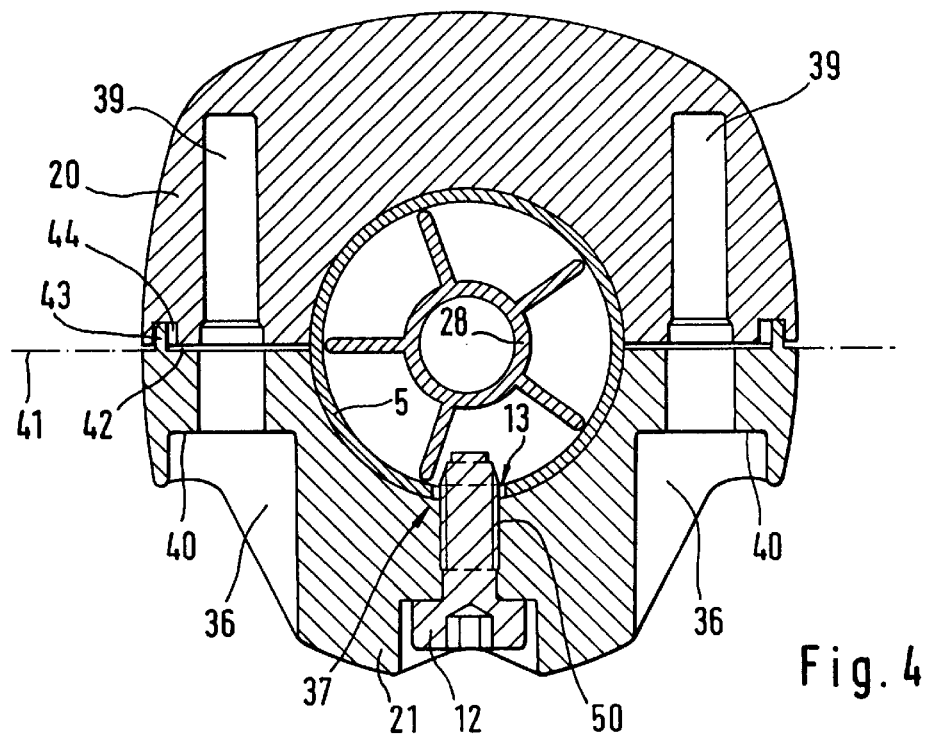
FIG. 4 is a section view through the collar taken along line IV—IV of FIG. 2.

As shown in FIG. 4, the shaft guide 28 is held centered in the guide tube 5 by its star-shaped cross section. The rotation lock for the guide tube 5 is so configured that the screw 12 is held with a thread 50 in the lower half shell 21 and projects with play into the bore 13 of the guide tube 5. The two half shells (20, 21) conjointly define a horizontal partition plane 41 and are aligned to each other on both sides by respective lugs 43 engaging corresponding slots 44. The two half shells (20, 21) can be connected to each other by clamping rings, snap connectors or the like and are connected to each other in the embodiment shown with threaded fasteners. For this purpose, two bores 36 are provided through which respective self-cutting screws (not shown) are guided and are both screwed into respective blind bores 39 until the screw head comes to rest on the shoulder 40. The lug 43 and the slot 44 are so dimensioned that a gap 42 remains between the two half shells (20, 21). With this gap 42, the guide tube 5 becomes clamped when tightening the screw connection with the screw head lying on the shoulder 40 to thereby establish the anti-rotation connection of the free end 11 with the guide tube 5. However, a form-tight, anti-rotation connection or a combination of a form-tight engagement and a frictional grip or engagement can be provided.

Figure 5:
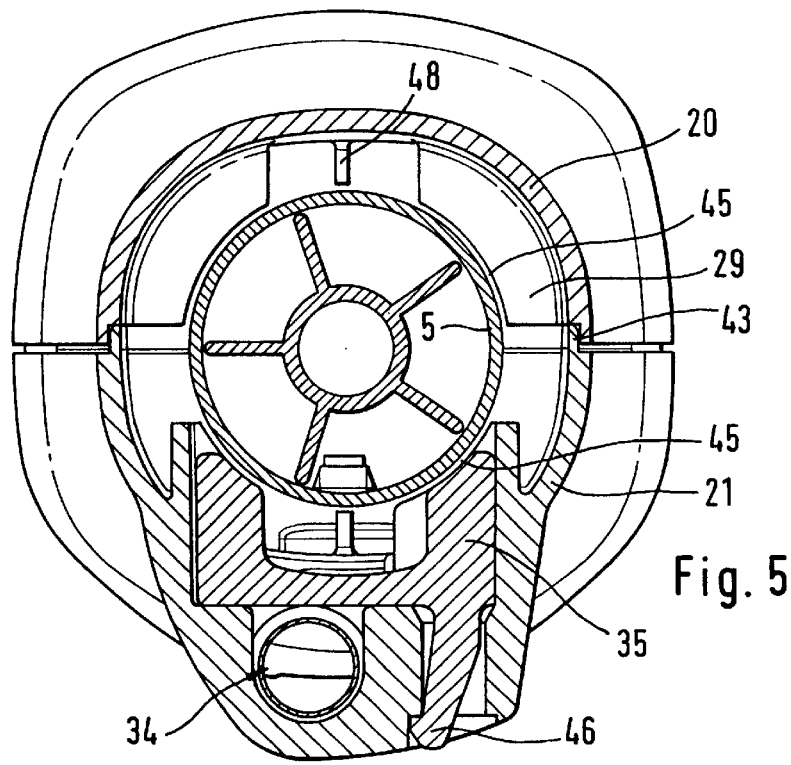
FIG. 5 is a section view of the collar taken along line V—V of FIG. 2.

In the cross section shown in FIG 5, it can be seen that gas line 34 is held by clamping elements 35 having a latch hook 46. The clamping element 35 is so formed that it functions as a supporting rib in the same manner as the support ribs 29 arranged in the upper shell 20. A gap 45 is provided between the clamping element 35 and the guide tube 5 and between the support rib 29 and the guide tube 5 in order not to hinder the rotation of the collar 10 relative to the guide tube 5.

Figure 6:
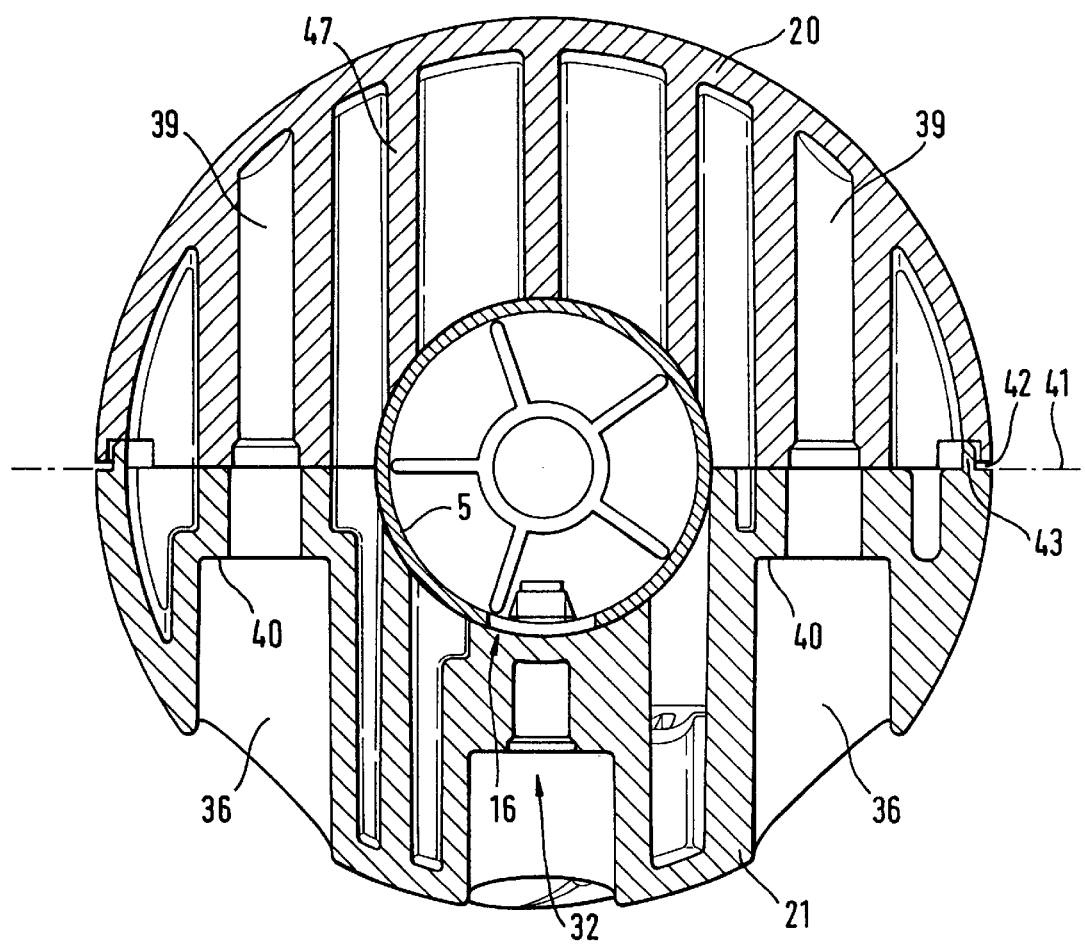
FIG. 6 is a section view through the same collar but along line VI—VI of FIG. 2.

Connecting the lower shell 21 to the upper shell 20 with threaded fasteners in the region of the radial bearing 16 in accordance with FIG. 6 is carried out similarly to the connection with threaded fasteners in the region of the free end 11 (FIG. 4) with bores 36, shoulders 40 and blind bores 39. The two half shells (20, 21) are built up from a system of ribs 47 in order to achieve a high strength and to consider the requirements of the injection-molding process. The gap 42 in the partition plane 41 is provided here in the region of the lugs 43 so that the two half shells (20, 21) can lie flush against each other in the region of the radial bearing 16 and thereby ensure a defined rotational movability of the guide tube 5 in the radial bearing 16.

It is understood that the foregoing description is that of the preferred embodiments of the invention and that various changes and modifications may be made thereto without departing from the spirit and scope of the invention as defined in the appended claims.

What is claimed is:

1. A brushcutter comprising:

a motor housing;

a guide tube having a first end at said motor housing and having a second end;

a work tool mounted on said second end of said guide tube;

an internal combustion engine mounted in said motor housing and having an output;

a drive shaft rotatably journalled in said guide tube for connecting said work tool to said output of said engine;

said engine being connected with said motor housing at said first end of said guide tube;

said guide tube having an end portion ending at said first end;

said motor housing having a sleeve-shaped collar extending approximately coaxially over said end portion;

said sleeve-shaped collar being formed as a damping torsion spring as one piece with said motor housing;

said sleeve-shaped collar engaging over said end portion of said guide tube approximately coaxially and said sleeve-shaped collar having a free end and said free end being at a distance (a) from said first end of said guide tube;

means for connecting said collar at said free end thereof to said guide tube at said distance (a) so that said collar and said free end cannot rotate relative to each other;

a support near said motor housing for receiving said first end of said guide tube therein so as to permit said first end and said support to rotate relative to each other; and, said support being configured as a radial slide bearing and the rotatable support of said first end of said guide tube in said radial slide bearing and the rotation fixed connection of said collar with said guide tube provided by said connecting means at said distance (a) conjointly defining a single rotation vibration damper between said guide tube and said internal combustion engine which permits said motor housing with said radial slide bearing to rotate relative to said first end of said guide tube.

2. The brushcutter of claim 1, said guide tube having a diameter (D); and, said distance (a) being a multiple of said diameter (D) of said guide tube.

3. The brushcutter of claim 1, said connecting means comprising a radial rotation lock for connecting said free end to said guide tube.

4. The brushcutter of claim 3, said radial rotation lock including a bore formed in said guide tube and a screw held in said free end of said collar and projecting into said bore in said guide tube.

5. The brushcutter of claim 1, said support for holding said first end of said guide tube being disposed in said collar close to said motor housing.

6. The brushcutter of claim 5, said support having a longitudinal stop.

7. The brushcutter of claim 1, said slide bearing having a first surface defining a first coefficient of friction and said guide tube having a second surface defining a second coefficient of friction and said first and second surfaces being in mutual contact; and, at least one of said first and second surfaces being machined to increase the coefficient of friction thereof.

8. The brushcutter of claim 5, said collar including a supporting rib formed thereon between said free end and said support.

9. The brushcutter of claim 1, said collar being formed of two half shells.

10. The brushcutter of claim 1, said collar being made of plastic.

11. The brushcutter of claim 1, said collar being made of plastic in an injection molding process.

12. The brushcutter of claim 10, said motor housing being formed of two half shells and said collar being formed of two half shells; and, each half shell of said motor housing being formed as one piece with a corresponding one of the half shells of said collar.

* * * * *